United States Patent Office 2,807,639
Patented Sept. 24, 1957

---

2,807,639

2-HALO-4,6-DITERTIARYALKYL PHENOL ESTERS

Herbert B. Rickert, Midland, Mich., assignor to The Dow Chemical Company, Midland, Mich., a corporation of Delaware No Drawing. Application May 11, 1955,
Serial No. 507,744

6 Claims. (Cl. 260—479)

The present invention is concerned with the 2-halo-4,6-ditertiaryalkylphenol esters of the formula

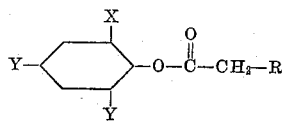

In this and succeeding formulae X represents bromine or chlorine, Y represents tertiarybutyl or tertiaryamyl and R represents hydrogen, chlorine, methyl or chloromethyl. These novel compounds are viscous liquids which are somewhat soluble in many common organic solvents and of very low solubility in water. They have been found to be particularly valuable as herbicides and adapted to be employed as active toxic constituents of compositions for the control of the growth and the killing of plants and for the sterilization of soil with regard to plant growth.

The new ester compounds may be prepared by several methods. In a convenient method the compounds are prepared by reacting a 2-halo-4,6-ditertiaryalkylphenol of the formula

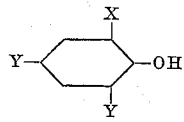

with an anhydride of the formula

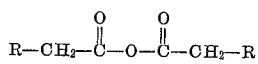

The reaction is carried out in the presence of a catalyst such as the sodium or potassium salt of the acid from which the employed anhydride reagent is prepared. Good results are obtained when employing substantially equimolecular proportions of the phenol and anhydride reagents and an amount of catalyst equal to at least 3 percent by weight of the employed phenol reagent. The employment of an excess of anhydride reagent results in optimum yields and is a preferred method of operation. The reaction between the phenol and anhydride reagents takes place smoothly at the temperature range of from 125° to 180° C. Conveniently, the reaction may be carried out at the boiling temperature of the reaction mixture and under reflux. Following the reaction, the reaction mixture is treated in conventional fashion to separate the desired product.

In carrying out the reaction, the 2-halo-4,6-ditertiaryalkylphenol, anhydride and catalyst are mixed together and the resulting mixture heated for a period of time at a temperature of from 125° to 180° C. Upon completion of the reaction, the reaction mixture may be cooled to room temperature and successively washed with dilute aqueous alkali and water. The desired product may be separated from the washed mixture by fractional distillation under reduced pressure.

In an alternative method, the new compounds may be prepared by reacting the 2-halo-4,6-ditertiarylalkylphenol reagent, as previously defined, with an acyl halide of the formula

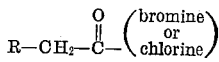

The reaction is carried out in the presence of a hydrogen halide acceptor such as pyridine. Good results are obtained when employing substantially equimolecular proportions of the substituted phenol, acyl halide and hydrogen halide acceptor. The employment of an excess of the acyl halide reagent results in optimum yields and is a preferred method of operation. The employment of an excess of pyridine does not adversely affect the reaction. Thus, the pyridine may be employed in excess as reaction solvent. The reaction is somewhat exothermic and takes place smoothly at temperatures of from 20° to 120° C. with the production of the desired ester and pyridine hydrochloride. The temperature may be controlled by regulating the rate of contacting the reactants and by external cooling.

In carrying out the reaction, the phenol, and hydrogen halide acceptor are mixed together and the acyl halide reagent added portionwise thereto with stirring and at a temperature of from 20° to 120° C. Upon completion of the reaction, the mixture is cooled to room temperature, filtered and the filtrate treated as previously described to separate the desired product.

The following examples illustrate the invention but are not to be construed as limiting:

*Example 1*

51 grams (0.176 mole) of 2-bromo-4,6-ditertiaryamylphenol, 185 grams (1.81 moles) of acetic anhydride and 20 grams of sodium acetate were mixed together and the resulting mixture heated with stirring at a temperature of from 134° to 135° C. for a period of about two hours. The mixture was then cooled to room temperature and successively washed with a mixture comprising 1500 milliliters of water and 15 milliliters of carbon tetrachloride, with dilute aqueous sodium bicarbonate and with water. The washed mixture was then concentrated by distilling under reduced pressure at gradually increasing temperatures up to a temperature of 100° C. at 5 millimeters pressure to obtain as a residue a 2-bromo-4,6-ditertiary-amylphenyl acetate product as a viscous liquid. The latter had a bromine content of 22.6 percent, a refractive index $n/D$ of 1.5150 at 25° C. and a specific gravity of 1.1626 at 25° C.

*Example 2*

185 grams (1.81 moles) of acetic anhydride and 20 grams of sodium acetate were mixed together and warmed to the boiling point. 50 grams (0.18 mole) of 2-bromo-4,6-ditertiary-butylphenol was added to the above mixture and the resulting product heated for two hours at the boiling temperature and under reflux. The reaction mixture was cooled to room temperature, the oily liquid layer decanted from the solids in the reaction mixture and the decanted liquid successively washed with water and dilute aqueous sodium hydroxide. As a result of these operations there was obtained a 2-bromo-4,6-ditertiarybutylphenyl acetate product as a viscous liquid containing 23.8 percent of bromine.

*Example 3*

4700 grams (19.5 moles) of 2-chloro-4,6-ditertiary-butylphenol, 4620 grams (45.3 moles) of acetic anhydride and 500 grams of sodium acetate were mixed together and the resulting mixture heated with stirring for two hours at a temperature of 140° C. The reaction mixture was then cooled to room temperature and thereafter successively washed with water and dilute aqueous sodium bicarbonate. Upon fractional distillation of the washed mixture under reduced pressure, a 2-chloro-4,6-ditertiarybutylphenyl acetate product boiling at 92°–93° C. at 0.1 millimeter pressure was obtained.

*Example 4*

200 grams (0.83 mole) of 2-chloro-4,6-ditertiary-butylphenol, 395 grams (3.03 moles) of propionic anhydride and 40 grams of sodium propionate were mixed together and the resulting mixture heated with stirring for 2¼ hours at a temperature of from 134° to 143° C. The reaction mixture was then cooled to room temperature, diluted with 100 milliliters of carbon tetrachloride and the diluted mixture successively washed with dilute aqueous sodium bicarbonate. The washed mixture was then concentrated by distilling under reduced pressure at gradually increasing temperatures up to a temperature of 91° C. at 0.1 millimeter pressure to obtain as a viscous liquid residue a 2-chloro-4,6-ditertiarybutylphenyl propionate product having a chlorine content of 12.3 percent. Fractional distillation of the latter product under reduced pressure gave 2-chloro-4,6-ditertiarybutylphenyl propionate boiling at 110°–113.5° C. at 0.1 millimeter pressure.

*Example 5*

100 grams (0.41 mole) of 2-chloro-4,6-ditertiarybutylphenol, 100 grams (0.98 mole) of chloroacetic anhydride and 10 grams of sodium chloroacetate were mixed together and the resulting mixture heated with stirring for two hours at a temperature of from 125° to 144° C. The mixture was then cooled to room temperature and successively washed with dilute aqueous sodium bicarbonate and water. The washed product was then fractionally distilled under reduced pressure to separate a 2-chloro-4,6-ditertiarybutylphenyl chloroacetate product boiling at 166°–167° C. at 4 millimeters pressure and having a specific gravity of 1.1311 and a refractive index n/D of 1.5159 at 25° C.

In a similar manner, other 2-halo-4,6-ditertiary-alkylphenol ester compounds may be prepared as follows:

2-bromo-4,6-ditertiarybutylphenyl acetate by the reaction of 2-bromo-4,6-ditertiarybutylphenol with acetyl bromide in the presence of pyridine.

2-chloro-4,6-ditertiaryamylphenyl chloroacetate by the reaction of 2-chloro-4,6-ditertiaryamylphenol with chloroacetic anhydride.

2-chloro-4,6-ditertiarybutylphenyl chloropropionate by the reaction of 2-chloro-4,6-dietertiarybutylphenol with chloroacetic anhydride.

2-bromo-4,6-ditertiaryamylphenyl chloropropionate by the reaction of 2-bromo-4,6-ditertiaryamylphenol with chloropropionic anhydride.

2-bromo-4,6-ditertiarybutylphenyl chloroacetate by the reaction of 2-bromo-4,6-ditertiarybutylphenol with chloroacetyl chloride in the presence of pyridine.

2-bromo-4,6-ditertiaryamylphenyl chloroacetate by the reaction of 2-bromo-4,6-ditertiaryamylphenol with chloroacetyl chloride in the pressure of pyridine.

The new ester products have been tested and found effective as herbicides. For such use, the products may be dispersed on an inert finely divided solid and employed as dusts, also such mixtures may be dispersed in water with the aid of a wetting agent and the resulting aqueous suspensions employed as sprays. In other procedures, the products may be employed as constituents of oil-in-water emulsions or water suspensions with or without the addition of wetting, dispersing or emulsifying agents.

The new ester compounds have been found to have a high toxicity to the seeds and seedlings of small seeded grasses such as crab grass, and a much lower toxicity to established stands of perennial grasses and to the seeds, emerging seedlings, and established plants of many desirable broadleaf crop plants. Thus, the compounds are particularly valuable for the selective control of small seeded grasses in growth media planted with or supporting the growth of many desirable broadleaf crop plants such as cotton, corn, beans and flax, or for the control of the seeds and seedlings of annual grasses such as crab grass in established stands of perennial grass. In operations against the seeds and emerging seedlings of small seeded grasses, good results are obtained at dosages of 10 pounds of ester compound per acre.

I claim:
1. An ester compound of the formula

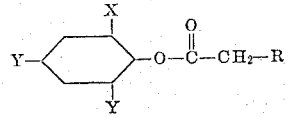

wherein X represents a member of the group consisting of bromine and chlorine, Y represents a member of the group consisting of tertiarybutyl and tertiaryamyl and R represents a member of the group consisting of hydrogen, chlorine, methyl and chloromethyl.

2. 2-bromo-4,6-ditertiarybutylphenyl acetate.
3. 2-chloro-4,6-ditertiarybutylphenyl acetate.
4. 2-chloro-4,6-ditertiarybutylphenyl chloroacetate.
5. 2-chloro-4,6-ditertiarybutylphenyl propionate.
6. 2-bromo-4,6-ditertiaryamylphenyl acetate.

References Cited in the file of this patent

UNITED STATES PATENTS

| | | |
|---|---|---|
| 2,221,808 | Mills et al. | Nov. 19, 1940 |
| 2,508,334 | Moyle | May 16, 1950 |
| 2,603,662 | Stevens | July 15, 1952 |

FOREIGN PATENTS

| | | |
|---|---|---|
| 892,752 | Germany | Oct. 8, 1953 |